United States Patent
St. Clair et al.

(10) Patent No.: US 10,776,186 B2
(45) Date of Patent: Sep. 15, 2020

(54) METHOD AND SYSTEM FOR DETECTION AND HANDLING OF DISCONTINUITIES IN EVENT DELIVERY SYSTEMS

(71) Applicant: salesforce.com, inc., San Francisco, CA (US)

(72) Inventors: Brian St. Clair, Lutz, FL (US); Alex S. Warshavsky, Walnut Creek, CA (US); John Arlan Brock, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/273,117

(22) Filed: Feb. 11, 2019

(65) Prior Publication Data

US 2020/0257574 A1 Aug. 13, 2020

(51) Int. Cl.
| | | |
|---|---|---|
| G06K 17/00 | (2006.01) | |
| G06F 9/54 | (2006.01) | |
| G06F 16/2458 | (2019.01) | |
| G06F 16/2455 | (2019.01) | |

(52) U.S. Cl.
CPC .......... *G06F 9/542* (2013.01); *G06F 16/2474* (2019.01); *G06F 16/24568* (2019.01)

(58) Field of Classification Search
CPC . G06F 9/542; G06F 16/24568; G06F 16/2474
See application file for complete search history.

(56) References Cited

U.S. PATENT DOCUMENTS

| | | |
|---|---|---|
| 7,730,478 B2 | 6/2010 | Weissman |
| 8,583,587 B2 | 11/2013 | Warshavsky et al. |
| 8,661,056 B1 | 2/2014 | Cinarkaya et al. |
| 8,925,041 B2 | 12/2014 | Bulumulla et al. |
| 8,973,106 B2 | 3/2015 | Warshavsky et al. |
| 8,977,647 B2 | 3/2015 | Viripaeff et al. |
| 8,990,144 B2 | 3/2015 | Warshavsky et al. |
| 9,298,842 B2 | 3/2016 | Cinarkaya et al. |
| 9,417,840 B2 | 8/2016 | Pradeep et al. |
| 9,628,412 B2 | 4/2017 | St. Clair et al. |
| 9,628,493 B2 | 4/2017 | Warshavsky et al. |

(Continued)

FOREIGN PATENT DOCUMENTS

| | | |
|---|---|---|
| EP | 3229151 A1 | 10/2017 |
| WO | 2018064375 A1 | 4/2018 |

*Primary Examiner* — Doon Y Chow
*Assistant Examiner* — Abdou K Seye
(74) *Attorney, Agent, or Firm* — Nicholson De Vos Webster & Elliott LLP

(57) ABSTRACT

A method and system for event delivery are described. A batch of events for a first topic with replay identifiers is received. Responsive to determining that there is an active replay identifier discontinuity information for the first topic, a determination is performed of whether the first batch of events includes a second set of events that fills the discontinuity identified in the replay identifier discontinuity information. Upon determining that the first batch of events includes a second subset of events with second respective replay identifiers that start from the last replay identifier and do not include a discontinuity the second subset of events is transmitted to an event consumer, and the replay identifier discontinuity information for the first topic is updated based on the second subset of events transmitted.

14 Claims, 5 Drawing Sheets

(56) References Cited

U.S. PATENT DOCUMENTS

| | | |
|---|---|---|
| 9,652,307 B1 * | 5/2017 | Soman .................... G06F 9/542 |
| 9,697,377 B2 | 7/2017 | Viripaeff et al. |
| 9,710,127 B2 | 7/2017 | Torman et al. |
| 9,729,556 B2 | 8/2017 | Brock |
| 9,767,022 B2 | 9/2017 | Pradeep et al. |
| 9,767,040 B2 | 9/2017 | Pradeep et al. |
| 9,774,603 B2 | 9/2017 | Brock |
| 9,785,782 B2 | 10/2017 | Bulumulla et al. |
| 10,037,316 B2 | 7/2018 | Mencke et al. |
| 10,049,131 B2 | 8/2018 | Torman et al. |
| 10,178,156 B2 | 1/2019 | Pradeep et al. |
| 10,185,603 B2 | 1/2019 | Pradeep et al. |
| 10,332,129 B2 | 6/2019 | Torman et al. |
| 10,339,126 B2 | 7/2019 | Pradeep et al. |
| 10,275,281 B2 | 8/2019 | Pradeep et al. |
| 10,380,094 B2 | 8/2019 | Warshavsky et al. |
| 10,452,462 B2 | 10/2019 | Oravivattanakul et al. |
| 10,496,456 B2 | 12/2019 | Pradeep et al. |
| 2013/0304833 A1 | 11/2013 | St. Clair et al. |
| 2014/0280766 A1 * | 9/2014 | Banerjee ................. H04L 65/60 709/219 |
| 2015/0106736 A1 | 4/2015 | Torman et al. |
| 2016/0063270 A1 | 3/2016 | Brock et al. |
| 2017/0075922 A1 | 3/2017 | Torman et al. |
| 2017/0083396 A1 * | 3/2017 | Bishop ................... G06F 11/14 |
| 2017/0293632 A1 | 10/2017 | Pradeep et al. |
| 2018/0025113 A1 | 1/2018 | Torman et al. |
| 2018/0096012 A1 | 4/2018 | Warshavsky et al. |
| 2018/0096165 A1 | 4/2018 | Warshavsky et al. |
| 2018/0253458 A1 * | 9/2018 | Goyal ................. H04L 67/1097 |
| 2018/0293258 A1 | 10/2018 | Oravivattanakul et al. |

\* cited by examiner

UPDATE THE REPLAY IDENTIFIER DISCONTINUITY INFORMATION FOR THE FIRST TOPIC BASED ON THE SECOND SUBSET OF EVENTS TRANSMITTED
218

SET THE GREATEST REPLAY IDENTIFIER OF REPLAY IDENTIFIERS OF THE SECOND SUBSET OF EVENTS AS THE LAST REPLAY IDENTIFIER FOR THE FIRST TOPIC IN THE REPLAY IDENTIFIER DISCONTINUITY INFORMATION
402

SET THE SMALLEST REPLAY IDENTIFIER OF REPLAY IDENTIFIERS OF THE FIRST BATCH THAT IS AFTER THE DISCONTINUITY AS A LAST REPLAY IDENTIFIER OF THE REPLAY IDENTIFIER DISCONTINUITY
404

SET A DETECTION TIME FOR THE REPLAY IDENTIFIER DISCONTINUITY
406

Fig. 4

METHOD AND SYSTEM FOR DETECTION AND HANDLING OF DISCONTINUITIES IN EVENT DELIVERY SYSTEMS

TECHNICAL FIELD

One or more implementations relate to the field of event consumption; and more specifically, to detection and handling of discontinuities in event delivery.

BACKGROUND ART

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience.

The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

In current event recordation systems, a high volume of events is published by multiple event producers and then delivered to multiple consumers. Events are published to an event recordation system with a replay identifier (replay ID). The replay identifier is representative of the order of event publishing. Each event is published through execution of a transaction that is processed prior to the event being committed in the event recordation system. The order by which events are committed to the event recordation system can be different from the order identified by the replay ID.

The distribution/delivery of the events to the event consumers is performed in a sequential order based on the replay IDs such that a first event with a replay ID smaller than the replay ID of a second event needs to be delivered to a consumer prior to the second event regardless of when the first event was stored in the event recordation system when compared with the second event. However, given that events can be stored in the event recordation system in an order that is different from the publication order of the events, the second event can be stored and therefore made available to consumers prior to the first event. In these scenarios if the consumers consumer the second event that results in the first event never being delivered to the event consumers.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 4 illustrates a flow of exemplary operations for updating the replay identifier discontinuity information for a topic, in accordance with some implementations.

DETAILED DESCRIPTION

The following description describes an event recordation and distribution system. More specifically, the following description includes descriptions of implementations of a system for delivery of events to event consumers without discontinuities.

Exemplary System

Figure 1:
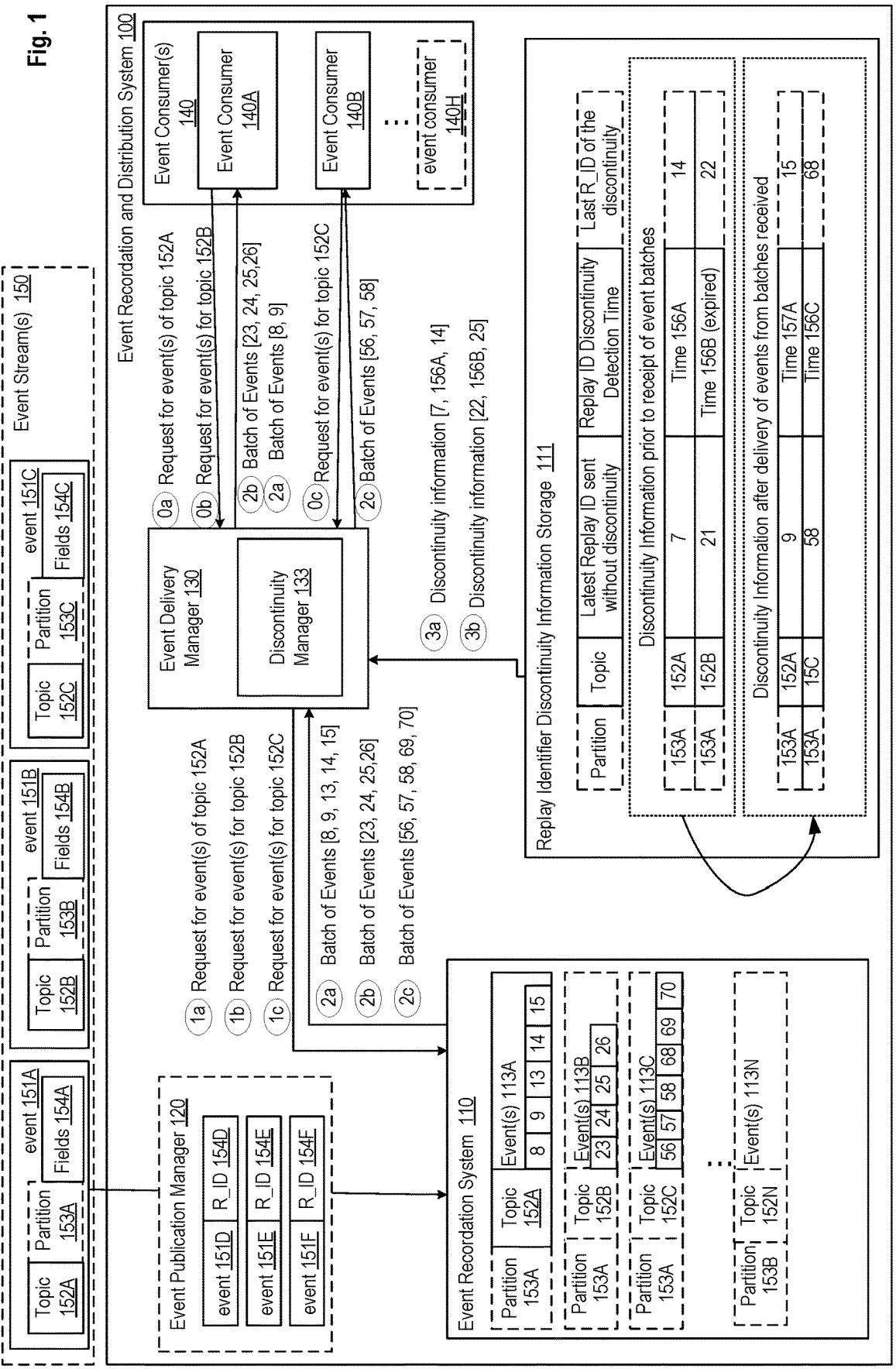
FIG. 1 illustrates a block diagram of an exemplary system for event delivery without discontinuities, in accordance with some implementations.

FIG. 1 illustrates a block diagram of an exemplary event recordation and distribution system, in accordance with some implementations. Event recordation and distribution system 100 (which may alternatively be referred to as the system 100) includes an event recordation system 110, an event publication manager 120, an event delivery manager 130, a replay identifier discontinuity information storage 111, one or more event consumers 140A-H.

An event (e.g., 151A-151C) in the system 100 is an identifiable unit of data that conveys information about operations that occur in a system (e.g., measurements recorded in an IoT device, actions performed by a user of a social networking system, failures of an operation or a system, etc.). The operations can be user-generated or system-generated. In some implementations, an event is associated with a topic. A topic can be information or details on the event that can be used to group one or more events, to publish the events, and to deliver the events to event consumers. In some implementations, an event can also be associated with a partition. The partition can be information on the event, which can be used to group multiple events. The partition and topic can be used to group events with the same topic and partition and can be used to transmit these events to one or more event consumers that requests them based on the partition and/or topic they are associated with. In a non-limiting example of a multi-tenant platform, the partition can be a tenant identifier (which can also be referred to as an organization identifier (org_ID)) where each one of the tenant identifiers uniquely identifies a tenant within the system. The topic can be a word or alphanumerical value added to an event generated in the system. Other examples of topics or partitions can be contemplated without departing from the scope of the present implementations.

In some implementations an event is associated with a topic when it is generated by an event producer. In some implementations, the event is also associated with a partition. The topic and/or partition can be added to the event as an additional field to the other data included in the event. The topic and partition can be used as a schema to store and retrieve the event in an event recordation system 110, when this event recordation system is a database. Each event is associated with a replay identifier. The replay identifier (replay ID) identifies the event in the event recordation and distribution system. The replay ID is assigned sequentially to events during publishing of the events such that a first event that is published to the event recordation and distribution system by an event producer is assigned a replay ID that is smaller than the replay ID of an event published to the event recordation and distribution system after the first event. The replay identifier enables an event consumer to indicate the event from which consumption is to start. While the replay identifier is representative of the order of event publishing, each event is published through execution of a transaction that is asynchronous with execution of other transactions for publishing subsequent events of a given topic. Each transaction commits the event (i.e., stores the event) in an order that is independent of the order set by the replay identifiers assigned to events of a topic. Thus, the order by which events are stored in the event recordation system 110 can be different from the order identified by the replay IDs. For example, the second event (with a replay ID that is greater than the replay ID of the first event) can be stored and therefore made available to event consumers prior to the first event. In these scenarios the consumers are likely to immediately consume the second event resulting in the first event never being delivered to the event consumers. The event consumers have then experienced gaps or discontinuities in the events delivered such that not all events published are delivered to these consumers.

The implementations described herein propose a mechanism of event delivery that enables delivery of events to event consumers without discontinuities. In order for event consumers to receive all the events without discontinuity/gaps, a discontinuity manager is operative to process the events prior to their transmission to the event consumers. In some implementations, the discontinuity manager can act as a filter to an event delivery manager.

In one implementation, a first batch of events of a first topic is received. Each event from the first batch of events is associated with a respective one of first replay identifiers. Each one of the first replay identifiers is indicative of a publishing order of the event in the event and recordation system. Responsive to determining that there is no replay identifier discontinuity information for the first topic that is active, a first subset of events from the first batch of events is delivered to an event consumer. Responsive to determining that there is a replay identifier discontinuity information for the first topic that is active, where the replay identifier discontinuity information includes a last replay identifier that identifies the last event transmitted to the event consumer for the first topic without discontinuity, a determination is performed of whether the first batch of events includes a second set of events that fills the discontinuity identified in the replay identifier discontinuity information. Upon determining that the first batch of events includes a second subset of events with second respective replay identifiers that start from the last replay identifier and do not include a discontinuity (i.e., that the second subset of events fills at least a portion of the previously identified discontinuity), the second subset of events is transmitted to the event consumer, and the replay identifier discontinuity information for the first topic is updated based on the second subset of events transmitted. Alternatively, upon determining that the first batch of events does not include any subsets of events that have continuous replay identifiers starting from the last event transmitted to the event consumer for the first topic without discontinuity, transmission of the first batch of events to the event consumer is skipped.

The above implementations are advantageous as compared to some conventional systems. For example, a first conventional system processes event publication transactions in sequence to ensure that publishing and storage of the events in an event recordation system are done in the same order. In this example, no event is stored in the event recordation system prior to an event that was published before it and delivery of the events is done based on the events stored. While this first conventional event publishing/delivery system ensures that the delivery/distribution of events to the event consumers is performed in the same order as the publishing of the events by the event producers, this first conventional system can significantly stall publishing and storage of the events as no events can be published without having all previous ones already stored.

In a second conventional system, the publishing path taken by events is separate from the event delivery path such that events are no longer required to be published in sequence. Delivery of events is done as soon as events are stored. However, publishing of events in this manner does not guarantee that the storage of the events is completed after all events published prior to these events were stored. This mechanism creates the possibility of gaps/discontinuities in the event delivered to event consumers.

Additional Details

The event system receives a stream of events 150 including multiple events 151A-C and is operative to store the events in one or more of the event recordation system (e.g., 110) and enable consumption/delivery of the events from these systems. In some implementations, the stream of events 150 can be received from a stream manager (not shown in FIG. 1) that manages the receipt of streams generated by one or more IoT devices, and/or application data source(s). The application data sources may include various applications running on software-as-a-service (SaaS), platform-as-a-service (PaaS) and/or infrastructure-as-a-service (IaaS) infrastructures. The applications can also include other types of distributed or non-distributed applications that produce streams of events.

Examples of events include device logs, clicks on links, impressions of recommendations, numbers of logins on a particular client, server logs, user's identities (sometimes referred to as user handles or user IDs and other times the users' actual names), content posted by a user to a respective feed on a social networking service, social graph data, metadata including whether comments are posted in reply to a prior posting, another event, or an article, and so forth. Events can be in a semi-structured data format like a JSON (JavaScript Option Notation), BSON (Binary JSON), XML, Protobuf, Avro or Thrift object, which present string fields (or columns) and corresponding values of potentially different types like numbers, strings, arrays, objects, etc. JSON objects can be nested and the fields can be multi-valued, e.g., arrays, nested arrays, etc., in other implementations.

In some implementations, terabytes of events per hour arrive for processing. In some implementations, the events are published to the recordation and distribution system 100 to be stored in one of multiple event recordation systems and intended to be consumed, in real-time, pseudo-real time, or on-demand, by one or more event consumers such as event consumers 140A-H.

Each stream of events from the event streams 150 includes multiple events. For example, streams 150 includes events 151A-C. Each event from the stream includes a topic, and one or more additional fields. The event may also include a partition. For example, the partition can include a tenant identifier. The additional fields can be referred to as a payload of the event. For example, event 151A has a topic 152A, an optional partition 153A, and one or more additional fields 154A. Event 151B has a topic 152A, an optional partition 153A, and one or more additional fields 154B. Event 151C has a topic 152A, an optional partition 153B, and one or more additional fields 154C. Typically, events of a stream may have one of multiple partitions and/or topics. Some events may share the same partition and/or the same topic.

In some implementations, when a partition refers to a tenant identifier in a multi-tenant environment, all events received with that same partition belong to the same tenant. When the topic is an alphanumerical value entered by a user of the multi-tenant system to be associated with a record, an account, a task, etc., some events of a stream may have the same topic. The topics allow the event consumers to request the events stored in the event recordation system 110. While the events are described as having a respective topic and partition, in some implementations, each event may only have a topic. The partition is an optional field that can be omitted in some implementations. For example, when the partition represents the identification of a tenant, when operating in a single tenant system, the events may not have a tenant identifier and therefore only a topic can be included in an event to enable event consumers to receive the events based on the topic.

Each instance from the instances of event consumers 140A-C is a process that is being executed on one or more servers of a distributed computing platform. The process is the actual execution of program code including instructions that form a computer program. Several instances may be associated with the same program code. For example, in a multi-tenant system, a first event consumer 140A is dedicated to a first tenant and a second event consumer 140C may execute the same code and be dedicated to a second tenant that is different from the first tenant.

The event consumers 140A-H are operative to request and consume events stored in the event recordation systems 110 based on the topic (and/or the partitions). The event consumers 140A-H can be used for gaining insight on the data embedded in the events, for gaining insight on the operations and actions performed in the applications and/or the IoT devices, and/or for gaining insight on the environment controlled or measured by the IoT devices and/or applications. In some implementations, the instances of the event consumers can request to obtain the events and process the events to perform one or more of audit, debug and support, forensic and compliance, and/or analytics of the applications and IoT devices. In some implementations, the event consumers 140A-H may be implemented in a distributed computing environment, where multiple instances of event consumers can be run on one or more servers. The event consumers 140 can be owned and operated by a same entity such as a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). Alternatively, the one or more event consumers can be operated by multiple entities such as different customers of an event recordation and distribution service.

The system 100 may include an optional event publication manager 120 that is operative to handle how and where the events are recorded/stored in one or more of the event recordation systems such as event recordation system 110. In some implementations, the event publication manager 120 may be external to the event distribution and recordation system 100. In other implementations, the event publication manager 120 may be part of the event distribution and recordation system 100. In some implementations, the event publication manager 120 is operative assign to each one of the events received a replay identifier. The replay identifier is indicative of a publishing order of each event in the event and recordation and distribution system 100. For example, upon receipt of the events 151D, 151E and 151F, the event publication manager 120 assigns replay identifier (R_ID) 154D, 154E, and 154F. When the events are associated with the same topic, the events 154D-F are assigned successive replay identifiers indicating that the event 154D is published prior to the event 154E, which is published prior to event 154F. Alternatively, when the events are associated with different topics the replay identifiers are assigned independently and events of each topic are assigned based on previous events for the same topic.

The publishing order is defined when a publishing transaction is initiated. The completion of the execution of the publishing transaction result in the event being stored in the event recordation system 110. While execution of a publishing transaction of a first event can start prior to execution of a publishing transaction of a second event, the storage of the second event can occur prior to the first event. This result in the second event with its respective second replay identifier being available for delivery to event consumers 140A-H prior to the first event with its respective first replay identifier, even if the first replay identifier is smaller than the second replay identifier.

In the event recordation system 110 the events are grouped with an associated topic (and in some implementations based on a topic and a partition). Each event is stored with a respective replay identifier as assigned by the event publication manager 120. In the illustrated example, only replay identifiers are shown for the events stored in the event recordation system 110. One of ordinary skill in the art would understand that each event stored may include additional fields (e.g., fields 154A) not illustrated. The event recordation system 110 includes a first set of events 113A stored for a first topic 152A and a second set of events 113B stored for a second topic 152B, and events 113N stored for topic 152N. Any number of topics can be included and events for these topics stored in the event recordation system 110 without departing from the scope of the implementations described herein. While the events are published in a given order (identified by successive and continuous replay identifier), the events may not be stored in that same order such that there may be discontinuities when of events when the events are consumed by event consumers. A discontinuity at the delivery side of the system means that events are delivered with replay identifiers that are not continuous and there is a gap between replay identifiers of two successive events received.

In some implementations, the event recordation system 110 may be one of several types of event recordation systems. For example, event recordation system 110 may be a messaging system implemented based on a publish/subscribe platform, or a long-term storage non-relational database. Alternatively, other types of data structure systems can be used for implementing the event recordation system 110 such as relational databases, etc. In some implementations, the event recordation system 110 is a short-term storage medium, where the events have a time to leave associated with them after which they expire, and they are deleted from the system.

The system may further include an event delivery manager 130 that is coupled with the event recordation system 110 and is operative to receive requests from the event consumers for events associated with atopic (or a topic and partition) and respond to these requests by transmitting events to the event consumers.

The event delivery manager 130 is operative to receive batches of events for one or more topics from the event recordation system 110 and deliver the events without any discontinuities to the event consumers 140. The event delivery manager determines based on replay identifier discontinuity information stored in storage 111 a set of events from the batch of events received that can be transmitted to event consumers for a given topic.

In some implementations, the receipt of a batch of events for a given topic (e.g., topic 152A, topic 152B or topic 152C) is a result of a request (e.g., requests 0a, 0b, and 0c) transmitted from an event consumer (e.g., 140A-H) to the event recordation system 110. The request is sent through the event delivery manager 130. In some implementations, transmitting a request includes subscribing to a topic. In some implementations, each event consumer is operative to subscribe to a single topic. Alternatively, each event consumer can subscribe to one or more topics. The event delivery manager 130 is operative to manage the subscription and delivery of the events based on the subscription. In some implementations, upon receipt of a request from an event consumer (e.g., a subscription to a topic), the event delivery manager 130 transmits the request to the event recordation system 110. For example, the event delivery manager 130 can in turn subscribe to the topic to receive the events prior to their delivery to the event consumer. The subscription can be made at an earlier time (prior to the receipt of the events) and events are continuously transmitted to the event delivery manager 130 based on this earlier subscription. The subscription can be a new subscription and only new events are transmitted. Alternatively, the request/subscription can specify a particular replay ID from which transmission of events need to be done. For example, while all batches illustrated in FIG. 1 show that all events stored in the event recordation system 110 are included in the batch, in other implementations, only the events with a replay identifier that is greater or equal than a replay identifier included in the request are transmitted.

The event delivery manager 130 is operative to receive batches of events for a given topic from the event recordation system 110 and deliver the events without any discontinuities to the event consumers 140. For example, the event delivery manager 130 can receive a batch of events (2a) for a topic 152A, a batch of events (2b) for topic 152A, and a batch of events (2c) for topic 152C. The batch of events (2a) includes events with replay identifiers 1, 2, 8, 9, and 10 corresponding to current replay identifiers of events stored at the event recordation system 110 for the topic 152A. The batch of events (2b) includes events with replay identifiers 23, 24, 25, and 26 corresponding to current replay identifiers of events stored at the event recordation system 110 for the topic 152B. The batch of events (2c) includes events with replay identifiers 56, 57, 58, 69, and 70 corresponding to current replay identifiers of events stored at the event recordation system 110 for the topic 152C.

For each topic for which a batch of events is received, the event delivery manager 130 determines whether there is a replay identifier discontinuity information that is active. Determining whether is an active replay identifier discontinuity information for a topic includes querying the storage 111 and determining whether there is discontinuity information stored for the topic and if this discontinuity information is still active (i.e., has not expired). Upon transmission of a query for a discontinuity information for topics 152, 152B, and 152C, the event delivery manager 130 receives replay identifier discontinuity information (referred to herein as discontinuity information) 3a and 3b. The discontinuity information 3a for the topic 152A and the discontinuity information 3b for the topic 152B. The event delivery manager 130 does not receive any discontinuity information for the topic 152C. This indicates that either any previous discontinuity information for the topic 152C were cleared or alternatively that there were none stored for this topic. A replay identifier discontinuity information can be cleared when it expires (after a predetermined time has elapsed following the detection time of the discontinuity) or alternatively if the events corresponding to the discontinuity are transmitted to an event consumer.

Responsive to determining that there is no active replay identifier discontinuity information for the first topic (i.e., either that there was no discontinuity information stored or alternatively that the discontinuity information present in storage 111 has expired), a first subset of events from the first batch of events is delivered to an event consumer. For example, upon receipt of the batch 2b, the event delivery manager 130 determines that the discontinuity information for this batch has expired by evaluating the time 156B. The discontinuity information for the topic 152B includes the time 156B, which indicates a time at which a replay identifier discontinuity was detected in events of the topic 152B. The event delivery manager 130 determines based on a predetermined maximum time and the replay identifier discontinuity detection time that the discontinuity information for topic 152B was stored for a period that is longer than the maximum time allowed indicating that this information has expired. When the information has expired, the event delivery manager 130 delivers the batch of events for topic 152B.

In some implementations, delivering the batch of events associated with a topic upon determining that there is no active discontinuity information includes determining whether the batch of events to be delivered includes a discontinuity by determining whether the replay identifiers of the batch of events have a discontinuity. Referring back to the example of batch 2b and batch 2c, the batch of events 2b does not include a discontinuity [23 to 26]. The replay IDs [23 to 26] are continuous successive replay identifiers of events for the topic 152C. Alternatively, the batch 2c includes a discontinuity such that the replay identifiers are not continuous. There is a first subset that is from 56 to 58 and a second subset with replay IDs 69 to 70.

Responsive to determining that the first replay identifiers include a discontinuity (e.g., batch 2c), a subset of events from the first batch is determined. The subset of events is such that replay identifiers associated with the subset of events includes an initial replay identifier that is smaller than all replay identifiers from the first replay identifiers [replay ID 56] and continuous successive replay identifiers from the first replay identifiers until the last replay identifier from the first replay identifiers before the discontinuity [i.e., replay ID 57 and 58]. The subset of events includes events with replay IDs 56, 57, and 58.

The discontinuity information is set for the topic 152C. For example, the new discontinuity information is updated for topic 152C to include that the latest replay identifier sent without discontinuity for the topic 152C (and partition 153A in some implementations) is 58, the time 156C is the time the discontinuity was detected, and the last replay identifier of the discontinuity is updated to 68. In some implementations, only the latest replay identifier sent without discontinuity is stored in the discontinuity information for a topic. Alternatively, additional information such that the time the discontinuity was detected, and the last replay identifier of the discontinuity are also stored. Additional information can be included as part of the discontinuity information without departing from the scope of the present implementations.

Alternatively, responsive to determining that the replay identifiers of the batch do not include a discontinuity (e.g., when the batch is batch 2b for topic 152B), the subset of events to is determined to include all events from the batch of events. Thus, the subset of events in the case of the batch 2c is all the events with replay IDs 23 to 26. These replay IDs are continuous, and all of the events are transmitted.

The subset of events is then transmitted. In some implementations, the subset of events includes all of the events from the batch (e.g., batch 2b) or alternatively a subset that is less than all of the events of the batch (e.g., batch 2c).

Upon receipt of a batch of events, and upon determining whether there is active replay identifier discontinuity information for the topic of the batch, the event delivery manager 130 may determine that there is active replay identifier discontinuity information for the first topic. For example, the discontinuity information 3a is active and indicates that there was a previous discontinuity detected for the topic 152A.

Responsive to determining that there is active replay identifier discontinuity information for the first topic, a determination of whether the first batch of events includes a second set of events that fills the discontinuity identified in the replay identifier discontinuity information. The replay identifier discontinuity information includes a last replay identifier that identifies the last event transmitted to the event consumer for the first topic without discontinuity. In some implementations, only the last replay identifier sent without discontinuity is stored in the discontinuity information for a topic. Alternatively, additional information such that the time the discontinuity was detected, and the last replay identifier of the discontinuity are also stored. Additional information can be included as part of the discontinuity information without departing from the scope of the present implementations. Determining that the second set of events fills a portion of the discontinuity includes determining that the batch of events received includes an event with a replay identifier that is the last replay identifier sent to an event consumer and whether the batch of events includes additional events between the last replay identifier sent and the last replay identifier of the discontinuity.

Referring to the example illustrated in FIG. 1, the event delivery manager 130 determines whether the batch 2a includes replay identifiers that fill the discontinuity indicated in the discontinuity information. For topic 152A, the discontinuity information indicates that the last event transmitted to an event consumer had a replay ID of 7, that the last event of the discontinuity had a replay ID of 14 and the time of detection of the discontinuity is 156A. The time indicating that the discontinuity information 3a is still valid and has not expired.

Upon determining that the first batch of events includes a second subset of events with second respective replay identifiers that start from the last replay identifier and do not include a discontinuity (i.e., that the second subset of events fills at least a portion of the previously identified discontinuity), the second subset of events is transmitted to the event consumer, and the replay identifier discontinuity information for the first topic is updated based on the second subset of events transmitted. In some implementations the second subset of events includes all the events of the batch, as the batch fills the entire discontinuity indicated by the discontinuity information. For example, if the event delivery manager 130 were to receive a batch of events including events with replay identifiers 7, 8, 9, 10, 11, 12, 13, and 14 for the topic 152A (not illustrated), the batch of events would fill the entire discontinuity indicated by discontinuation information 3a and all of the events from the batch would be transmitted to an event consumers. The determination of whether the batch fills the entire discontinuity is performed based on the last replay identifier sent without discontinuity and the last replay identifier of the discontinuity. This is done by determining that the batch of events includes events with replay identifiers that include the last replay identifier sent to the event consumer without discontinuity, the last replay identifier of the discontinuity, and all replay identifier between the last replay identifier sent to the event consumer and the last replay of the discontinuity.

When the batch fills the entire discontinuity indicated by the discontinuity information the discontinuity information is cleared upon transmission of the entire batch. In some implementations clearing the discontinuity information can include deleting the discontinuity information. Alternatively, in some implementations, clearing the discontinuity information includes setting the values of the latest replay identifier the replay discontinuity detection time and the last replay identifier of the discontinuity to default values that indicate that no discontinuity information is present for the topic.

In other implementations, the second subset of events is less that all the events received in the batch and only this subset from the batch is transmitted. For example, the batch 2a, includes events with replay IDs 8, 9, 13, 14, and 15. The discontinuity information 3a indicates that the last event sent had a replay ID 7, and that the discontinuity had a last replay ID of 14. The batch of events 2a is determined to fill a portion of the discontinuity identified such that events with replay IDs 8 and 9 can be transmitted. The batch of events is determined to fill a portion of the discontinuity as it includes a replay identifier that is the last replay identifier sent to the event consumer but does not include all of the events with replay identifiers between the last replay identifier sent and the last replay identifier of the discontinuity. In addition, the replay identifier discontinuity information for the first topic is updated based on the second subset of events transmitted. The discontinuity information is updated to include the replay ID of the last event from the second subset that is sent to the event consumer, in this example, the replay ID is 9. In some implementations, the discontinuity information is further updated to include the time of detection of the discontinuity (157A) and a last replay ID of the discontinuity here replay ID 13.

Alternatively, upon determination that the first batch of events does not include any subsets of events that have continuous replay identifiers starting from the last event transmitted to the event consumer for the first topic without discontinuity, the event delivery manager 130 skips transmission of the first batch of events to the event consumer. Thus, upon determination that the batch of events received for a topic does not include any events that fill the discontinuity indicated in the discontinuity information for the topic, this batch of events is ignored and not transmitted to the event consumers. For example, if batch 2a included only the events with replay IDs 13, 14, and 15 without the two events with replay IDs 8 and 9, the batch of events would have been discarded entirely.

While the implementations herein are described with respect to a single event consumer receiving events for a given topic, in other implementations multiple event consumers may receive events of a topic. These events can be duplicated by the event delivery manager to be transmitted to multiple event consumers. The events are still transmitted in the same order for all event consumers to ensure integrity and continuity of the event replay identifiers.

The implementations of the present application describe a mechanism for event delivery without any discontinuities. The discontinuities of batches of events are tracked and information recorded such that the event delivery is performed based on this information. Events are transmitted to event consumers only if the replay IDs are continuous. The implementations herein maximize the number of events that can be transmitted to a consumer without discontinuity. In some implementations, the discontinuity information is stored for a predetermined period of time and may expire and deleted after that period of time has elapsed. This allows for a tradeoff between correctly detecting all gaps that may occur and using more memory to store the discontinuity information. The expiration of the discontinuity information allows to reduce the amount of memory that would be otherwise needed to store all of the discontinuity until they are cleared.

Figure 2:
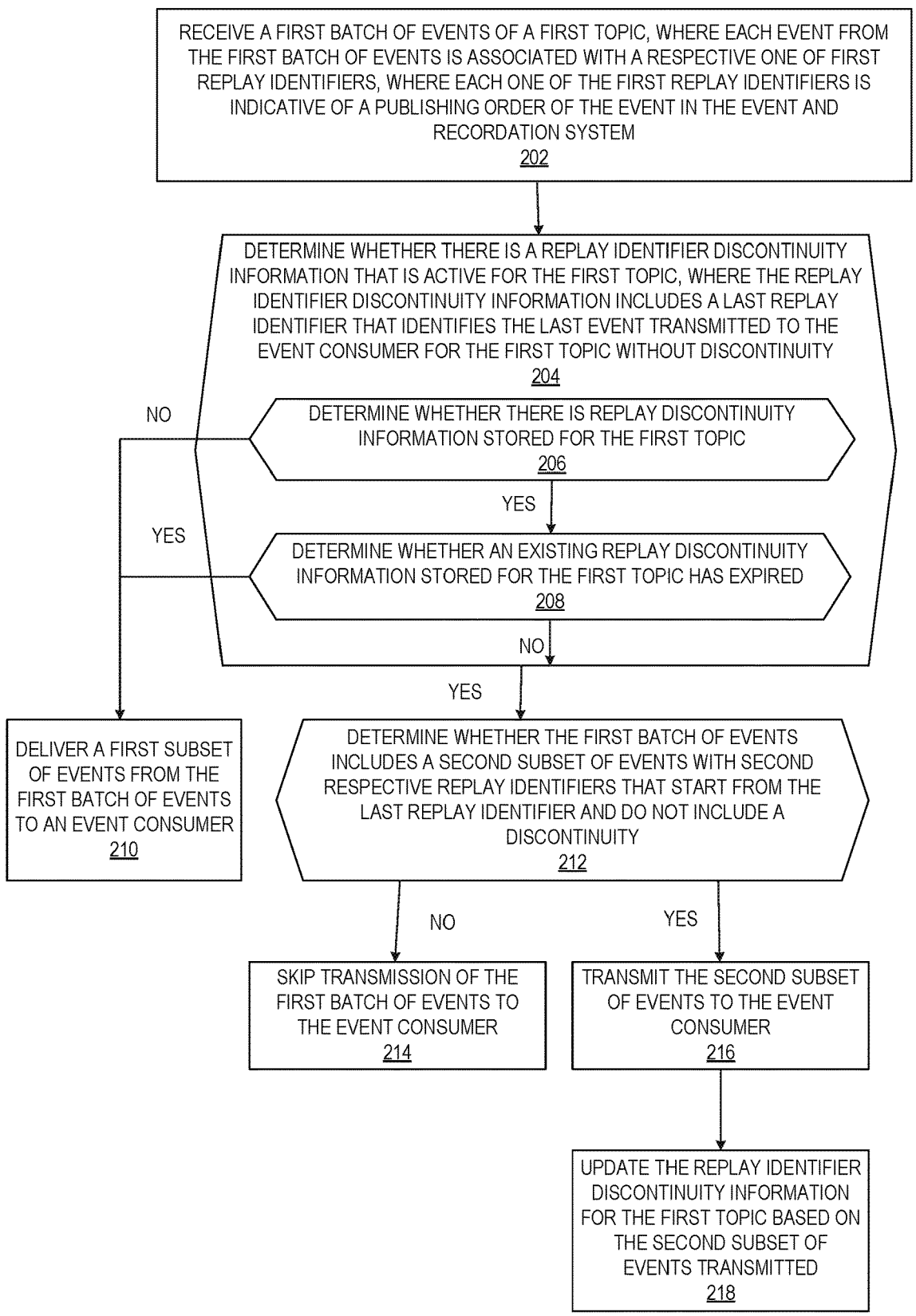
FIG. 2 illustrates a flow diagram of exemplary operations for delivery of events without discontinuities, in accordance with some implementations.
Figure 3:
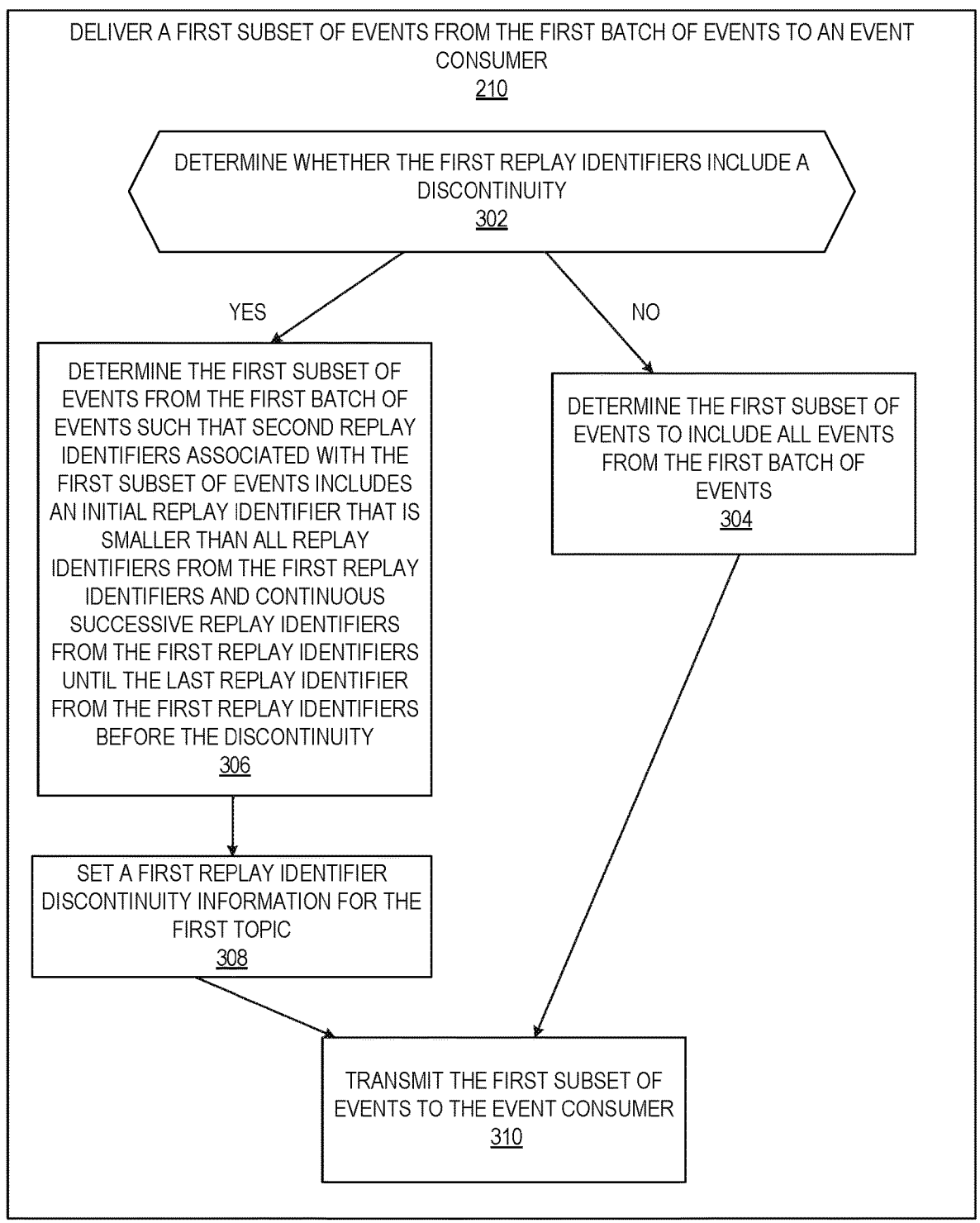
FIG. 3 illustrates a flow diagram of exemplary operations for delivery of a subset of events from a batch of events, in accordance with some implementations.

The operations in the flow diagrams of FIGS. 2-4 are described with reference to the exemplary implementations in FIG. 1. However, the operations of the flow diagrams can be performed by implementations other than those discussed with reference to FIG. 1, and the implementations discussed with reference to these figures can perform operations different than those discussed with reference to the flow diagrams.

FIG. 2 illustrates a flow diagram of exemplary operations for delivery of events without discontinuities, in accordance with some implementations. In some implementations, the operations of FIG. 2 are performed by the event delivery manager 130. In particular, the operations can be performed by a discontinuity manager 133 that is operative to enable a delivery manager to deliver the events without any discontinuities to the event consumers 140.

At operation 202, the event delivery manager 130 receives a first batch of events of a first topic. Each event from the first batch of events is associated with a respective one of first replay identifiers and each replay identifier is indicative of a publishing order of the event in the event recordation system. For example, the event delivery manager 130 can receive a batch of events (2a) for a topic 152A, a batch of events (2b) for topic 152A, and a batch of events (2c) for topic 152C. The batch of events (2a) includes events with replay identifiers 1, 2, 8, 9, and 10 corresponding to current replay identifiers of events stored at the event recordation system 110 for the topic 152A. The batch of events (2b) includes events with replay identifiers 23, 24, 25, and 26 corresponding to current replay identifiers of events stored at the event recordation system 110 for the topic 152B. The batch of events (2c) includes events with replay identifiers 56, 57, 58, 69, and 70 corresponding to current replay identifiers of events stored at the event recordation system 110 for the topic 152C.

At operation 204, the event delivery manager 130 determines whether there is a replay identifier discontinuity information for the first topic that is active. This is performed for each topic for which a batch of events is received. Determining whether is an active replay identifier discontinuity information for a topic includes querying the storage 111 and determining at operation 206, whether there is discontinuity information stored for the topic. Upon determining that there is no replay discontinuity information stored for the first topic the flow of operations moves to operation 210.

Upon determining that there is a replay discontinuity information stored for the topic, the flow of operation moves to operation 208. At operation 208, the event delivery manager 130 determines whether the discontinuity information has expired (i.e., is no longer active). Referring to the example of FIG. 1, upon transmission of a query for a discontinuity information for topics 152, 152B, and 152C, the event delivery manager 130 receives replay identifier discontinuity information (referred to herein as discontinuity information) 3a and 3b. The discontinuity information 3a for the topic 152A and the discontinuity information 3b for the topic 152B. The event delivery manager 130 does not receive any discontinuity information for the topic 152C. This indicates that either any previous discontinuity information for the topic 152C were cleared or alternatively that there were none stored for this topic. A replay identifier discontinuity information can be cleared when it expires (after a predetermined time has elapsed following the detection time of the discontinuity) or alternatively if the events corresponding to the discontinuity are transmitted to an event consumer.

Responsive to determining that there is no active replay identifier discontinuity information for the first topic (i.e., either that there was no discontinuity information stored or alternatively that the discontinuity information present in storage 111 has expired), a first subset of events from the first batch of events is delivered to an event consumer, at operation 210.

Upon determining that there is an active replay identifier discontinuity information for the first topic, the flow of operations moves to operation 212. For example, the discontinuity information 3a is active and indicates that there was a previous discontinuity detected for the topic 152A.

At operation 212, responsive to determining that there is a replay identifier discontinuity information for the first topic that is active, a determination of whether the first batch of events includes a second set of events that fills the discontinuity identified in the replay identifier discontinuity information is performed. The replay identifier discontinuity information includes a last replay identifier that identifies the last event transmitted to the event consumer for the first topic without discontinuity. In some implementations, only the last replay identifier sent without discontinuity is stored in the discontinuity information for a topic. Alternatively, additional information such that the time the discontinuity was detected, and the last replay identifier of the discontinuity are also stored. Additional information can be included as part of the discontinuity information without departing from the scope of the present implementations. Determining that the second set of events fills a portion of the discontinuity includes determining that the batch of events received includes an event with a replay identifier that is the last replay identifier sent to an event consumer and whether the batch of events includes additional events between the last replay identifier sent and the last replay identifier of the discontinuity. For example, the event delivery manager 130 determines whether the batch 2*a* includes replay identifiers that fill the discontinuity indicated in the discontinuity information. For topic 152A, the discontinuity information indicates that the last event transmitted to an event consumer had a replay ID of 7, that the last event of the discontinuity had a replay ID of 14 and the time of detection of the discontinuity is 156A. The time indicating that the discontinuity information 3*a* is still valid and has not expired.

Upon determining that the first batch of events includes a second subset of events with second respective replay identifiers that start from the last replay identifier and do not include a discontinuity (i.e., that the second subset of events fills at least a portion of the previously identified discontinuity), the second subset of events is transmitted, at operation 216, to the event consumer, and the replay identifier discontinuity information for the first topic is updated, at operation 218, based on the second subset of events transmitted. In some implementations the second subset of events includes all the events of the batch, as the batch fills the entire discontinuity indicated by the discontinuity information. For example, if the event delivery manager 130 were to receive a batch of events including events with replay identifiers 7, 8, 9, 10, 11, 12, 13, and 14 for the topic 152A (not illustrated), the batch of events would fill the entire discontinuity indicated by discontinuation information 3*a* and all of the events from the batch would be transmitted to an event consumers. The determination of whether the batch fills the entire discontinuity is performed based on the last replay identifier sent without discontinuity and the last replay identifier of the discontinuity. This is done by determining that the batch of events includes events with replay identifiers that include the last replay identifier sent to the event consumer without discontinuity, the last replay identifier of the discontinuity, and all replay identifier between the last replay identifier sent to the event consumer and the last replay of the discontinuity.

When the batch fills the entire discontinuity indicated by the discontinuity information the discontinuity information is cleared upon transmission of the entire batch. In some implementations clearing the discontinuity information can include deleting the discontinuity information. Alternatively, in some implementations, clearing the discontinuity information includes setting the values of the latest replay identifier the replay discontinuity detection time and the last replay identifier of the discontinuity to default values that indicate that no discontinuity information is present for the topic.

In other implementations, the second subset of events is less that all the events received in the batch and only this subset from the batch is transmitted. For example, the batch 2*a*, includes events with replay IDs 8, 9, 13, 14, and 15. The discontinuity information 3*a* indicates that the last event sent had a replay ID 7, and that the discontinuity had a last replay ID of 14. The batch of events 2*a* is determined to fill a portion of the discontinuity identified such that events with replay IDs 8 and 9 can be transmitted. The batch of events is determined to fill a portion of the discontinuity as it includes a replay identifier that is the last replay identifier sent to the event consumer but does not include all of the events with replay identifiers between the last replay identifier sent and the last replay identifier of the discontinuity. In addition, the replay identifier discontinuity information for the first topic is updated based on the second subset of events transmitted. The discontinuity information is updated to include the replay ID of the last event from the second subset that is sent to the event consumer, in this example, the replay ID is 9. In some implementations, the discontinuity information is further updated to include the time of detection of the discontinuity (157A) and a last replay ID of the discontinuity here replay ID 13.

Alternatively, upon determination that the first batch of events does not include any subsets of events that have continuous replay identifiers starting from the last event transmitted to the event consumer for the first topic without discontinuity, the flow of operations moves to operation 214, at which the event delivery manager 130 skips transmission of the first batch of events to the event consumer. Thus, upon determination that the batch of events received for a topic does not include any events that fill the discontinuity indicated in the discontinuity information for the topic, this batch of events is ignored and not transmitted to the event consumers. For example, if batch 2*a* included only the events with replay IDs 13, 14, and 15 without the two events with replay IDs 8 and 9, the batch of events would have been discarded entirely.

FIG. 3 illustrates a flow diagram of exemplary operations for delivery of a subset of events from a batch of events, in accordance with some implementations. In some implementations, delivering the first subset of events from the first batch of events to an event consumer includes the operations 302-310.

At operation 302, the event delivery manager 130 determines whether the replay identifiers of the batch of events have a discontinuity. This is an indication of whether the batch of events to be delivered includes a discontinuity. Referring back to the example of batch 2*b* and batch 2*c*, the batch of events 2*b* does not include a discontinuity [23 to 26]. The replay IDs [23 to 26] are continuous successive replay identifiers of events for the topic 152C. Alternatively, the batch 2*c* includes a discontinuity such that the replay identifiers are not continuous. There is a first subset that is from 56 to 58 and a second subset with replay IDs 69 to 70.

Responsive to determining that the first replay identifiers include a discontinuity (e.g., batch 2*c*), a subset of events from the first batch is determined at operation 306. The subset of events is such that replay identifiers associated with the subset of events includes an initial replay identifier that is smaller than all replay identifiers from the first replay identifiers [replay ID 56] and continuous successive replay identifiers from the first replay identifiers until the last replay identifier from the first replay identifiers before the discontinuity [i.e., replay ID 57 and 58]. The subset of events includes events with replay IDs 56, 57, and 58.

At operation 308, the discontinuity information for the topic 152C is set. For example, the new discontinuity information is updated for topic 152C to include that the latest replay identifier sent without discontinuity for the topic 152C (and partition 153A in some implementations) is 58, the time 156C is the time the discontinuity was detected, and the last replay identifier of the discontinuity is updated to 68. In some implementations, only the latest replay identifier sent without discontinuity is stored in the discontinuity information for a topic. Alternatively, additional information such that the time the discontinuity was detected, and the last replay identifier of the discontinuity are also stored. Additional information can be included as part of the discontinuity information without departing from the scope of the present implementations.

Alternatively, responsive to determining that the replay identifiers of the batch do not include a discontinuity (e.g., when the batch is batch 2*b* for topic 152B), the flow of operations moves to operation 304, at which the subset of events is determined to include all events from the batch of events. For example, the subset of events in the case of the batch 2*c* is all the events with replay IDs 23 to 26. These replay IDs are continuous, and all of the events are included in the subset of events to be transmitted to event consumers.

At operation 310, the subset of events is transmitted to one or more event consumers. In some implementations, the subset of events includes all of the events from the batch (e.g., batch 2*b*) or alternatively a subset that is less than all of the events of the batch (e.g., batch 2*c*).

FIG. 4 illustrates a flow of exemplary operations for updating the replay identifier discontinuity information for a topic, in accordance with some implementations. The operations of FIG. 4 can be performed when a new discontinuity information is stored for a topic (e.g., topic 152C) or when an existing discontinuity information is updated for a topic (e.g., topic 152A).

At operation 402, the greatest replay identifier of replay identifiers of the second subset of events is set as the last replay identifier for the first topic in the replay identifier discontinuity information. For example, 9 is set as the last replay ID for topic 152A in discontinuity information for this topic when the subset of events with replay IDs 8 and 9 are transmitted to an event consumer.

At operation 404, the smallest replay identifier of replay identifiers of the first batch that is after the discontinuity is set as a last replay identifier of the replay identifier discontinuity. For example, 15 is set as last R_ID of the discontinuity for topic 152A.

At operation 406, a detection time for the replay identifier discontinuity is set. In some implementations only operation 402 is performed, in other implementations a combination of two or more of operations 402, 404, and 406 are performed.

The implementations of the present application describe a mechanism for event delivery without any discontinuities. The discontinuities of batches of events are tracked and information recorded such that the event delivery is performed based on this information. Events are transmitted to event consumers only if the replay IDs are continuous. The implementations herein maximize the number of events that can be transmitted to a consumer without discontinuity. In some implementations, the discontinuity information is stored for a predetermined period of time and may expire and deleted after that period of time has elapsed. This allows for a tradeoff between correctly detecting all gaps that may occur and using more memory to store the discontinuity information. The expiration of the discontinuity information allows to reduce the amount of memory that would be otherwise needed to store all of the discontinuity until they are cleared.

General Architecture:

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

"Cloud computing" services provide shared resources, software, and information to computers and other devices upon request. In cloud computing environments, software can be accessible over the internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 5A:
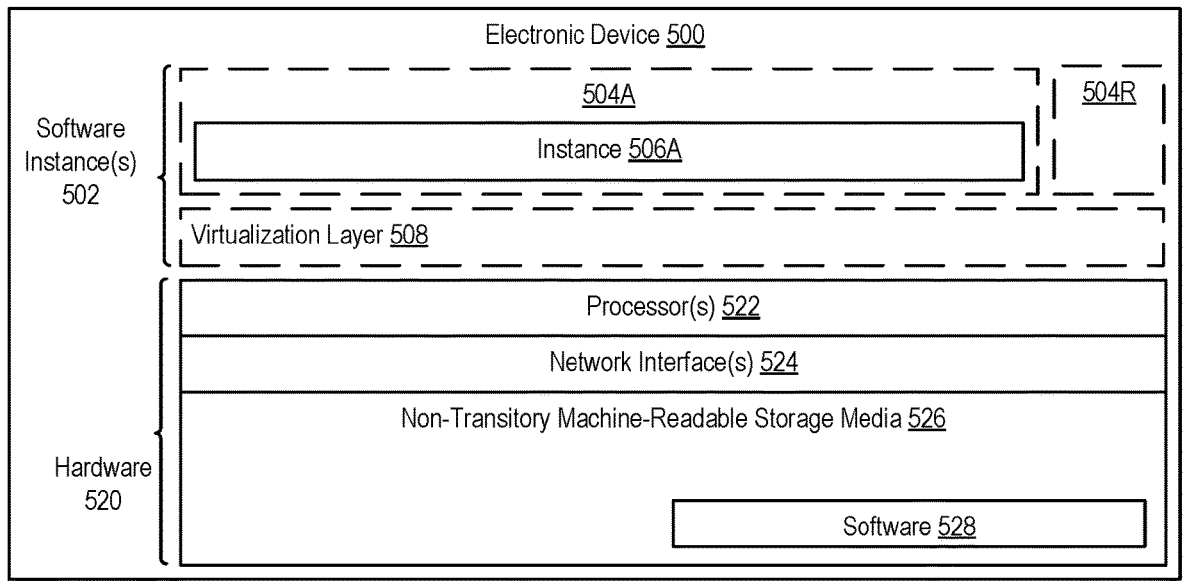
FIG. 5A is a block diagram illustrating an electronic device, in accordance with some implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522).

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Figure 5B:
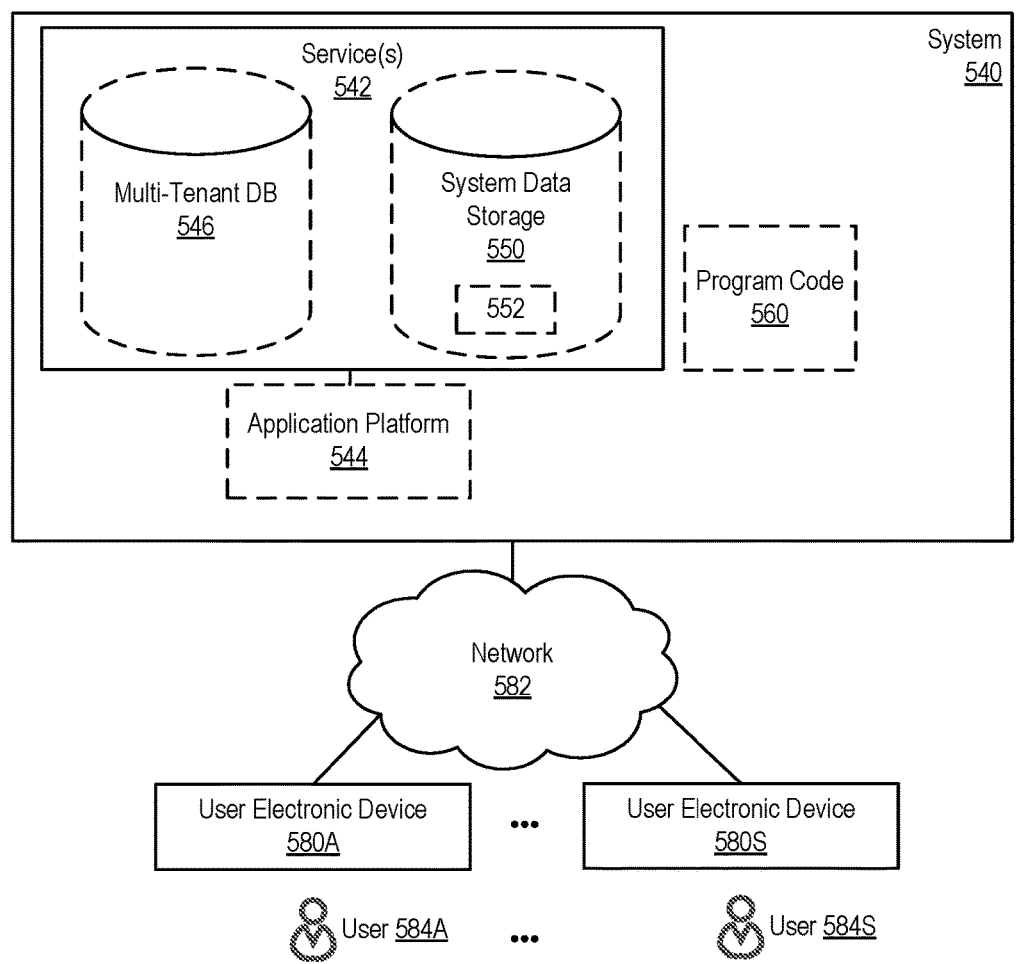
FIG. 5B is a block diagram of an environment where a mechanism for event delivery may be deployed, in accordance with some implementations.

FIG. 5B is a block diagram of an environment where a mechanism for event delivery may be deployed, in accordance with some implementations. A system 540 includes hardware (a set of one or more electronic devices) and software to provide service(s) 542, including the log consumers and/or the tokenizer. The system 540 is coupled to user electronic devices 580A-S over a network 582. The service(s) 542 may be on-demand services that are made available to one or more of the users 584A-S working for one or more other organizations (sometimes referred to as outside users) so that those organizations do not need to necessarily be concerned with building and/or maintaining a system, but instead makes use of the service(s) 542 when needed (e.g., on the demand of the users 584A-S). The service(s) 542 may communicate with each other and/or with one or more of the user electronic devices 580A-S via one or more Application Programming Interface(s) (APIs) (e.g., a Representational State Transfer (REST) API). The user electronic devices 580A-S are operated by users 584A-S.

In one implementation, the system 540 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may utilize one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user electronic device 580A-S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007.

Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of event delivery in an event recordation and distribution system, the method comprising:
   receiving, from an event recordation system, a first batch of events of a first topic, wherein each event from the first batch of events is associated with a respective one of first replay identifiers that is indicative of a publishing order of the event in the event recordation and distribution system, the publishing order of the event being independent of an order by which a commit of a transaction for storing the event occurred in the event recordation system;
   responsive to determining that there is no replay identifier discontinuity information for the first topic that is active, delivering a first subset of events from the first batch of events to an event consumer; and
   responsive to determining that there is a replay identifier discontinuity information for the first topic that is active, wherein the replay identifier discontinuity information includes a last replay identifier that identifies a last event transmitted to the event consumer for the first topic without discontinuity, performing the following:
      responsive to determining that the first batch of events includes a second subset of events with second respective replay identifiers that start from the last replay identifier and do not include a discontinuity, performing the following:
         transmitting the second subset of events to the event consumer, and
         updating the replay identifier discontinuity information for the first topic based on the second subset of events transmitted, and
      responsive to determining that the first batch of events does not include any subsets of events that have continuous replay identifiers starting from the last event transmitted to the event consumer for the first topic without discontinuity, skipping transmission of the first batch of events to the event consumer.

2. The method of claim 1, wherein the updating the replay identifier discontinuity information for the first topic based on the second subset of events transmitted includes:
   setting a greatest replay identifier of replay identifiers of the second subset of events as a last replay identifier for the first topic in the replay identifier discontinuity information.

3. The method of claim 1, wherein the delivering the first subset of events from the first batch of events to the event consumer includes:
   responsive to determining that the first replay identifiers include a discontinuity, performing the following:
      determining the first subset of events from the first batch of events such that second replay identifiers associated with the first subset of events includes an initial replay identifier that is smaller than all replay identifiers from the first replay identifiers and continuous successive replay identifiers from the first replay identifiers until the last replay identifier from the first replay identifiers before the discontinuity, and
      setting a first replay identifier discontinuity information for the first topic;
   responsive to determining that the first replay identifiers do not include a discontinuity, determining the first subset of events to include all events from the first batch of events; and
   transmitting the first subset of events to the event consumer.

4. The method of claim 1 further comprising:
   responsive to determining that the first batch of events does not include a discontinuity, the second subset of events includes all events from the first batch of events.

5. The method of claim 1, wherein the event consumer subscribed to receive events for the first topic.

6. The method of claim 1 further comprising prior to the receiving, from an event recordation system, the first batch of events of the first topic:
   transmitting a request for events of the first topic, wherein the request includes a latest replay identifier identifying the last event delivered to the event consumer; and
   wherein the first batch of events includes events with replay identifiers greater than the latest replay identifier.

7. The method of claim 1, wherein determining that there is no active replay identifier discontinuity information for the first topic includes at least one of the following:
   determining that there is no replay discontinuity information stored for the first topic; and
   determining that an existing replay discontinuity information stored for the first topic has expired.

8. A non-transitory computer readable storage medium that stores instructions that when executed by one or more processors of an event recordation and distribution system causes the one or more processors to perform the following operations:
   receiving from an event recordation system, a first batch of events of a first topic, wherein each event from the first batch of events is associated with a respective one of first replay identifiers that is indicative of a publishing order of the event in the event recordation and distribution system, the publishing order of the event being independent of an order by which a commit of a transaction for storing the event occurred in the event recordation system;
   responsive to determining that there is no replay identifier discontinuity information for the first topic that is active, delivering a first subset of events from the first batch of events to an event consumer; and responsive to determining that there is a replay identifier discontinuity information for the first topic that is active, wherein the replay identifier discontinuity information includes a last replay identifier that identifies a last event transmitted to the event consumer for the first topic without discontinuity, performing the following:
responsive to determining that the first batch of events includes a second subset of events with second respective replay identifiers that start from the last replay identifier and do not include a discontinuity, performing the following:
transmitting the second subset of events to the event consumer, and
updating the replay identifier discontinuity information for the first topic based on the second subset of events transmitted, and
responsive to determining that the first batch of events does not include any subsets of events that have continuous replay identifiers starting from the last event transmitted to the event consumer for the first topic without discontinuity, skipping transmission of the first batch of events to the event consumer.

9. The non-transitory computer readable storage medium of claim 8, wherein the updating the replay identifier discontinuity information for the first topic based on the second subset of events transmitted includes:
setting a greatest replay identifier of replay identifiers of the second subset of events as a last replay identifier for the first topic in the replay identifier discontinuity information.

10. The non-transitory computer readable storage medium of claim 8, wherein the delivering the first subset of events from the first batch of events to the event consumer includes:
responsive to determining that the first replay identifiers include a discontinuity, performing the following:
determining the first subset of events from the first batch of events such that second replay identifiers associated with the first subset of events includes an initial replay identifier that is smaller than all replay identifiers from the first replay identifiers and continuous successive replay identifiers from the first replay identifiers until the last replay identifier from the first replay identifiers before the discontinuity, and
setting a first replay identifier discontinuity information for the first topic;
responsive to determining that the first replay identifiers do not include a discontinuity, determining the first subset of events to include all events from the first batch of events; and
transmitting the first subset of events to the event consumer.

11. The non-transitory computer readable storage medium of claim 8, wherein the operations further comprise:
responsive to determining that the first batch of events does not include a discontinuity, the second subset of events includes all events from the first batch of events.

12. The non-transitory computer readable storage medium of claim 8, wherein the event consumer subscribed to receive events for the first topic.

13. The non-transitory computer readable storage medium of claim 8, wherein the operations further comprise prior to the receiving, from the event recordation system, the first batch of events of the first topic:
transmitting a request for events of the first topic, wherein the request includes a latest replay identifier identifying the last event delivered to the event consumer; and
wherein the first batch of events includes events with replay identifiers greater than the latest replay identifier.

14. The non-transitory computer readable storage medium of claim 8, wherein determining that there is no active replay identifier discontinuity information for the first topic includes at least one of the following:
determining that there is no replay discontinuity information stored for the first topic; and
determining that an existing replay discontinuity information stored for the first topic has expired.

\* \* \* \* \*